US009156699B2

(12) United States Patent
Yamada et al.

(10) Patent No.: US 9,156,699 B2
(45) Date of Patent: Oct. 13, 2015

(54) METHOD FOR PRODUCING GRAPHENE, AND GRAPHENE

(71) Applicant: NATIONAL INSTITUTE OF ADVANCED INDUSTRIAL SCIENCE AND TECHNOLOGY, Chiyoda-ku, Tokyo (JP)

(72) Inventors: Takatoshi Yamada, Tsukuba (JP); Jaeho Kim, Tsukuba (JP); Masatou Ishihara, Tsukuba (JP); Yoshinori Koga, Tsukuba (JP); Masataka Hasegawa, Tsukuba (JP); Sumio Iijima, Tsukuba (JP)

(73) Assignee: NATIONAL INSTITUTE OF ADVANCED INDUSTRIAL SCIENCE AND TECHNOLOGY, Tokyo (JP)

( * ) Notice: Subject to any disclaimer, the term of this patent is extended or adjusted under 35 U.S.C. 154(b) by 0 days.

(21) Appl. No.: 13/963,369

(22) Filed: Aug. 9, 2013

(65) Prior Publication Data
US 2013/0327981 A1  Dec. 12, 2013

Related U.S. Application Data

(63) Continuation of application No. PCT/JP2012/053098, filed on Feb. 10, 2012.

(30) Foreign Application Priority Data

Feb. 10, 2011 (JP) ................................ 2011-027260
Mar. 31, 2011 (JP) ................................ 2011-077342

(51) Int. Cl.
| | | |
|---|---|---|
| *C01B 31/04* | (2006.01) | |
| *B82Y 30/00* | (2011.01) | |
| *B82Y 40/00* | (2011.01) | |

(52) U.S. Cl.
CPC ............. *C01B 31/0446* (2013.01); *B82Y 30/00* (2013.01); *B82Y 40/00* (2013.01); *C01B 31/0453* (2013.01)

(58) Field of Classification Search
CPC  C01B 31/0453; C01B 31/0446; C01B 31/04; C01B 31/0407; C01B 31/0415; C01B 2204/00; C01B 2204/02; C01B 2204/04; C01B 2204/06; C01B 2204/065; C01B 2204/20; C01B 2204/22; C01B 2204/24; C01B 2204/28; C01B 2204/30; C01B 2204/32; B82Y 40/00; B82Y 30/00
USPC .................. 423/448; 252/182.12; 204/157.43
See application file for complete search history.

(56) References Cited

U.S. PATENT DOCUMENTS

| | | | |
|---|---|---|---|
| 2009/0155561 A1 * | 6/2009 | Choi et al. ..................... | 428/220 |
| 2009/0324897 A1 | 12/2009 | Choi et al. | |
| 2010/0301212 A1 | 12/2010 | Dato et al. | |

FOREIGN PATENT DOCUMENTS

WO   WO 2011/112598   * 9/2011 ............. C01B 31/02

OTHER PUBLICATIONS

Kim, et al., Low-temperature synthesis of large-area graphene-based transparent conductive films using surface wave plasma chemical vapor deposition, Applied Physics Letters 2011; 98: 091502, pp. 1-3.*

(Continued)

*Primary Examiner* — Daniel C McCracken
(74) *Attorney, Agent, or Firm* — Lowe Hauptman & Ham, LLP

(57) ABSTRACT

A technique for forming graphene which solves problems involved in formation of graphene by a thermal CVD method and a resin carbonization method that a high temperature is used and the treatment time is long and can form graphene at a lower temperature in a shorter time is provided. The above problems are solved by performing hydrogen plasma treatment on a copper foil substrate having an organic substance applied thereon by use of a surface wave microwave plasma treatment device and forming graphene on the copper foil substrate by the hydrogen plasma treatment.

14 Claims, 18 Drawing Sheets

(56) References Cited

OTHER PUBLICATIONS

Yihong Wu, et al., "Carbon Nanowalls Grown by Microwave Plasma Enhanced Chemical Vapor Deposition", Adv. Mater, Jan. 4, 2002, vol. 14, No. 1, pp. 64-67.
Xuesong Li, et al., "Large-Area Synthesis of High-Quality and Uniform Graphene Films on Copper Foils", Science, 2009, vol. 324, pp. 1312-1314.
Xuesong Li, et al., "Transfer of Large-Area Graphene Films for High-Performance Transparent Conductive Electrodes", Nano Letters, 2009, vol. 9, No. 12, pp. 4359-4363.
L. G. Cançado, et al., "Influence of the Atomic Structure on the Raman Spectra of Graphite Edges", Physical Review Letters, Dec. 10, 2004, vol. 93, pp. 247401_1-247401_4.
Zhengzong Sun, et al., "Growth of graphene from solid carbon sources", Nature, Nov. 25, 2010, vol. 468, pp. 549-552, doi:10.1038/nature09579.
L. M. Malard, et al., "Physics Reports", 2009, vol. 473, pp. 51-87.
International Search Report of PCT/JP2012/053098 mailed on Jun. 3, 2012.
Xu Zhanwei, et al., "Large-scale production of graphene by microwave synthesis and rapid cooling", Chem Commun, Jan. 28, 2011, vol. 47, No. 4, pp. 1166-1168.
G.D. Yuan, et al., "Graphene sheets via microwave chemical vapor deposition", Chemical Physics Letters, Nov. 27, 2008, vol. 467, pp. 361-364.
Extended European Search Report issued in EP Patent Application No. 12745110.2 dated Feb. 17, 2014.
C.N.R. Rao et al, "Graphene: The New Two-Dimensional Nanomaterial", Angewandte Chemie International Edition, vol. 48, No. 42, Oct. 5, 2009, pp. 7752-7777, XP055100165, cited in the ESSR.
Marcinek M et al., "Microwave plasma chemical vapor deposition of graphitic carbon thin films", Carbon, Elsevier, Oxford, GB, vol. 48, No. 5, Dec. 28, 2009, pp. 1552-1557, XP026893528, cited in the ESSR.
Hojati-Talemi P et al., "Preparation of graphene nanowalls by a simple microwave-based method", Carbon, Elsevier, Oxford, GB, vol. 48, No. 14, Jul. 6, 2010, pp. 3993-4000, XP027247356, cited in the ESSR.
Alexander Malesevic et al., "Synthesis of few-layer graphene via microwave plasma-enhanced chemical vapour deposition", Nanotechnology, IOP, Bristol, GB, vol. 19, No. 30, Jul. 30, 2008, pp. 305604, XP020136787, cited in the ESSR.
Japanese Office Action for Application No. JP2012-556939 dated Oct. 21, 2014.
Office Communication dated Jun. 23, 2015 regarding a corresponding European patent application No. 12745110.2.
Sukang Bae et al: "Roll-to-roll production of 30-inch graphene films for transparent electrodes", Nature Nanotechnology, vol. 5, No. 8, Aug. 1, 2010, pp. 574-578, XP055049935, ISSN:1748-3387, DOI: 10.1038/nnano.2010.132.
M Moisan et al, "Plasma Sources based on the propagation of electromagnetic surface waves", No. 24, Jan. 28, 1991, pp. 1025-1048.

\* cited by examiner

METHOD FOR PRODUCING GRAPHENE, AND GRAPHENE

CROSS REFERENCE TO RELATED APPLICATIONS

This application is based upon and claims the benefit of priority from the prior Japanese Patent Application No. 2011-027260, filed on Feb. 10, 2011, Japanese Patent Application No. 2011-077342, filed on Mar. 31, 2011 and PCT Application No. PCT/JP2012/053098, filed on Feb. 10, 2012, the entire contents of which are incorporated herein by reference.

FIELD

The present invention relates to a method for producing graphene usable for a transparent conductive film or the like, and graphene.

BACKGROUND

A conductive planar crystal of SP2-bonded carbon atoms is called "graphene". Graphene is described in detail in Kumi YAMADA, Kagaku to Kogyo (Chemistry and Industry), 61 (2008) pp. 1123-1127. Graphene is a basic unit of various forms of crystalline carbon films. Examples of crystalline carbon films formed of graphene include monolayer graphene formed of one layer of graphene, nanographene which is a nanometer-size stack of several layers to about ten layers of graphene, carbon nanowall (see Y. Wu, P. Qiao, T. Chong, Z. Shen, Adv. Mater. 14 (2002) pp. 64-67) which includes a graphene stack including several layers to about ten layers of graphene and is located at an angle close to 90 degrees with respect to a substrate surface, and the like.

A crystalline carbon film formed of graphene is expected to be used for a transparent conductive film or a transparent electrode owing to a high light transmittance and a high electric conductivity thereof. In addition, the carrier mobility of electrons and holes in graphene may be possibly 200,000 $cm^2/Vs$ at the maximum, which is 100 times as high as that of silicon at room temperature. Utilizing this property of graphene, a super high-speed transistor operable at a rate of the order of terahertz is being developed.

For producing graphene, various methods have been developed so far, including a method of peeling off graphene from natural graphite, a method of treating silicon carbonate at a high temperature to cause silicon to be desorbed, a method of forming graphene on a surface of various types of metal materials, and the like. Regarding a transparent conductive carbon film using a crystalline carbon film formed of graphene, a wide variety of industrial uses have been examined. For realizing such uses, a method for producing a graphene film in a large area size at a high throughput is now desired.

Recently, methods of producing graphene by chemical vapor deposition (CVD) performed on a copper foil surface have been developed (Non-patent Xuesong Li, Weiwei Cai, Jinho An, Seyoung Kim, Junghyo Nah, Dongxing Yang, Richard Piner, Aruna Velamakanni, InhwaJung, Emanue L Tuluc, Sanjay K. Banerjee, Luigi Columbo, Rodney S. Ruoff, Science, Vol. 324, 2009, pp. 1312-1314, and Xuesong Li, Yanwu Zhu, Weiwei Cai, Mark Borysiak, Boyang Han, David Chen, Richard D. Piner, Luigi Colombo, Rodney S. Ruoff, Nano Letters, Vol. 9, 2009, pp. 4359-4363). Such a method of producing a graphene film by use of a copper foil as a substrate adopts a thermal CVD method. More specifically, methane gas, which is material gas, is thermally decomposed at about 1000° C. to form one to several layers of graphene on the copper foil.

The above-mentioned method of producing graphene by CVD basically uses a gas-form material such as methane gas or the like. For producing graphene, various solid materials such as various reins and the like may be used, but it is difficult to use these materials for CVD. In addition, with CVD using gas as a material, it is difficult to produce graphene on a specific part of the substrate in a specific pattern. Therefore, graphene needs to be processed to be patterned after being produced on the substrate. In order to solve these problems, a method of forming graphene by a resin carbonization method has been recently developed. According to this method, poly (methyl methacrylate) (PMMA) is applied to a copper foil to form a PMMA film, and the PMMA film on the copper foil is heated at 800° C. to 1000° C. in a mixed gas atmosphere of hydrogen and argon (ZhengzongSun, Zheng Yan, Jun Yao, Elvira Beitler, Yu Zhu, James M. Tour, NATURE, doi: 10.1038/nature09579).

SUMMARY

The above-mentioned methods of producing graphene by the thermal CVD method and the resin carbonation method which use a copper foil as a substrate are considered to be promising as an industrial production method of graphene.

However, these methods have been found as having the following problem: thermal CVD is performed at a high temperature close to 1080° C., which is the melting point of copper, and therefore the shape of the copper foil surface is changed due to vaporization or recrystallization of copper during the formation of graphene.

One desirable method for forming graphene in a larger area size at a high throughput may be a technique of continuously feeding a substrate form a substrate roll to a film formation area to form a film and the formed film is taken up by a take-up roll. However, it is difficult to use this technique for the thermal CVD method or the resin carbonization method, by which the temperature of the substrate becomes high.

For industrially producing graphene at a high throughput, a technique of producing a graphene film at a lower temperature in a shorter reaction time than the currently available thermal CVD or resin carbonization method is desired to be developed.

The present invention made in light of the above-described situation has an object of providing a technique for forming graphene which solves the problems of the conventional thermal CVD and resin carbonization methods that a high temperature is used and the treatment time is long and can form graphene at a lower temperature in a shorter time.

The present inventors accumulated active studies in order to achieve the above-described object and found a novel technique for forming graphene at a low temperature in a short time. It has been found that by this technique, graphene can be formed at a lower temperature in a shorter time than by the conventional techniques and thus the above-described problems of the conventional art can be solved.

The present invention have been completed based on such knowledge, and is as follows.

[1] A method for producing graphene, comprising performing plasma treatment using hydrogen-containing gas on a metal substrate having an organic substance applied thereon under a low pressure while a temperature inside a surface wave microwave plasma treatment device is set to 500° C. or lower, thereby growing graphene on a surface of the organic substance.

[2] A method for producing graphene, comprising performing plasma treatment using hydrogen-containing gas on a metal substrate having an organic substance applied thereon under a low pressure while a temperature inside a surface wave microwave plasma treatment device is set to 500° C. or lower, thereby forming a stack including the metal substrate and graphene grown on a surface of the organic substance applied on the metal substrate; and peeling off the graphene from the metal substrate.

[3] A method for producing graphene according to [1] or [2], wherein the organic substance is poly(methyl methacrylate) or benzotriazole.

[4] A method for producing graphene according to any one of [1] through [3], wherein the metal substrate is a copper thin film.

[5] Graphene produced by a method for producing graphene according to any one of [1] through [4].

[6] A metal substrate having an organic substance, the metal substrate being usable for a method for producing graphene according to any one of claims [1] through [4].

DESCRIPTION OF EMBODIMENTS

Figure 1:
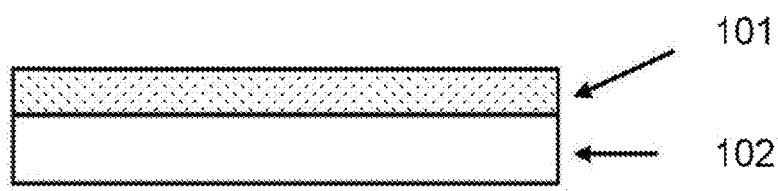
FIG. 1 is a view schematically showing a copper foil substrate having an organic substance applied thereon according to the present invention.

According to a method for producing graphene of the present invention, graphene is formed by reforming an organic substance by actions of charged particles and electron energy generated by plasma, and a catalytic function of a metal material such as nickel, copper, iridium, platinum or the like. Therefore, graphene can be formed at a lower temperature in a shorter time than by the conventional resin carbonization method.

Graphene according to the present invention can be obtained by mainly adopting a specific production condition. Graphene can be formed at a lower temperature in a shorter time by performing plasma treatment on a metal foil having an organic substance applied thereon. A film having a large area size can be formed by using a copper foil substrate having an organic substance applied thereon and by using a surface wave microwave plasma method.

Materials usable for the substrate for the method for producing graphene according to the present invention include metal materials having a catalytic function such as nickel, copper, iridium, platinum and the like. In order to form graphene without changing the shape of the surface of the metal foil substrate and also without vaporizing the metal foil, plasma treatment needs to be performed at a sufficiently lower temperature than the melting point of the metal foil.

In the case of, for example, a copper foil substrate, plasma treatment needs to be performed at a sufficiently lower temperature than the melting point of copper (1080° C.).

Usually, microwave plasma treatment is performed at a pressure of $2 \times 10^3$ to $1 \times 10^4$ Pa. At such a pressure, plasma is not easily diffused and is concentrated to a narrow area. As a result, the temperature of the neutral gas in the plasma becomes 1000° C. or higher. Therefore, the copper foil substrate is heated to 800° C. or higher and thus a large amount of copper is vaporized from the surface of the copper foil. Such a technique is not applicable to the formation of graphene. In addition, there is a limit in broadening the plasma area uniformly, and thus it is difficult to form graphene in a large area size with high uniformity.

In order to keep the temperature of the copper foil low during the film formation and form graphene in a large area size with high uniformity, the plasma treatment needs to be performed at a lower pressure.

According to the present invention, surface wave microwave plasma, which can be generated and kept stably even at a pressure of $10^2$ Pa or lower, is generated and is used for the plasma treatment.

Surface wave microwave plasma is described in detail in, for example, Hideo SUGAI, Plasma Electronics, Ohmsha, Ltd. (2000), pp. 124-125.

Owing to the above, the temperature can be made sufficiently lower than the melting point of the copper foil substrate, and plasma can be generated uniformly in a large area size of 380 mm×340 mm or larger.

Plasma was diagnosed by a Langmuir probe method (single probe method) and the following results were obtained. The electron density was $10^{11}$ to $10^{12}/cm^3$, which exceeded the cut-off electron density for a microwave having a frequency of 2.45 GHz, namely, $7.4\times10^{10}/cm^3$. The plasma was confirmed to be surface wave plasma generated and kept by a surface wave.

The Langmuir probe method is described in detail in, for example, Hideo SUGAI, Plasma Electronics, Ohmsha, Ltd. (2000) page 58.

CVD conditions usable in the present invention are as follows. The substrate temperature is 500° C. or lower, preferably 50 to 500° C., and more preferably 50 to 400° C.

The pressure is 50 Pa or lower, preferably 2 to 50 Pa, and more preferably 2 to 20 Pa.

The treatment time is not specifically limited, but is about 1 second to 50 minutes, and preferably about 1 second to 20 minutes. Graphene is obtained with the treatment time approximately in such a range.

Gas usable for the microwave plasma treatment according to the present invention is hydrogen or mixed gas of hydrogen and inert gas. Examples of inert gas include helium, neon, argon and the like.

Organic substances usable for the microwave plasma treatment according to the present invention include the following substances having a carbon atom in a basic skeleton of the structure thereof: acrylic resins such as polyacrylic acid, polyacrylic acid ester, polymethacrylic acid, polymethacrylic acid ester, poly(methyl methacrylate) and the like; benzotriazoles such as polyethyleneglycol-bis(1,2,3-benzotriazolyl ether), polyethyleneglycol-1,2,3-benzotriazolyl ether, and the like; polymers such as poly(vinyl chloride), polyethylene, phenol resins and the like; etc. Preferably, acrylic resins which can be formed into a film and benzotriazoles having a rustproof function are usable.

EXAMPLES

Hereinafter, the present invention will be described by way of examples, but the present invention is not limited to the following examples.

In the following examples, an organic substance applied to a copper foil was subjected to hydrogen plasma treatment by use of a surface wave microwave plasma treatment device. The details will be described below.

(Method for Forming an Organic Substance/Copper Foil Structure)

The copper foil substrate having the organic substance applied thereon used in the present invention includes an organic substance thin film (101) bonded to the copper foil in a small thickness and a copper foil as a mother substrate (102). FIG. 1 schematically shows the copper foil having the organic substance applied thereon, which was used in these examples.

According to the present invention, the organic substance dissolved in a solvent is applied to the copper foil (102) to form the organic substance thin film (101).

The organic substances used in these examples, namely, poly(methyl methacrylate) and benzotriazole were treated as follows.

A method for forming a copper foil having poly(methyl methacrylate) as an organic substance applied thereon will be described.

2 g of methyl methacrylate polymer powder ($[CH_2C(CH_3)COOCH_3]n$ produced by Tokyo Chemical Industry Co., Ltd.) and 48 g of methoxybenzene (Methoxybenzene $CH_3OC_6H_5$ produced by Wako Pure Chemical Industries, Ltd.) were mixed and stirred to completely dissolve the methyl methacrylate polymer powder. About 5 ml of the obtained organic substance solution was dripped to the copper foil (102) having a size of 150 mm×220 mm and a thickness of 33 μm and located on a flat and smooth table, and was spread to be thin and uniform with a plastic spatula. An excessive part of the organic substance solution was wiped out by a waste cloth or the like. The obtained substance was treated for 1 hour in a drier of 50° C. to be completely dried, and thus a copper foil substrate having the organic substance (101) applied thereon was produced.

A method for forming a copper foil having benzotriazole as an organic substance applied thereon will be described.

Benzotriazole was applied by a conventionally known spray method. The time used for the application was several seconds, and the temperature of the substrate at the time of the application was about 50° C. After the application, benzotriazole was dried by a drier.

Hereinafter, methods for measuring the Raman scattering spectrum, the light transmittance and the electric conductivity of a graphene film formed by the technique according to the present invention will be described.

(Method for Measuring the Raman Scattering Spectrum)

As a sample, graphene provided on a copper foil substrate by the technique according to the present invention was used. The measuring device was XploRA produced by Horiba, Ltd. The wavelength of the exciting laser was 638 nm, the diameter of the laser beam spot was 1 micron, the grating of the spectroscope was 600, and the output of the laser source was 9.3 mV. No beam attenuator was used. The aperture size was 100 μm, the slit size was 100 μm, and the magnification of the objective lens was 100×. The exposure time was 5 seconds. The spectrum was obtained by adding the results of the measurement performed 10 times.

It is described in a non-patent document (L. M. Malard, M. A. Pimenta, G. Dresselhaus and M. S. Dresselhaus, Physics Reports 473 (2009) pp. 51-87) and the like that the peak positions of the 2D band, G band, D band and D' band depend on the number of layers of the graphene film or the exciting wavelength of the laser at the time of measurement of the Raman scattering spectrum. In the case of, for example, a monolayer graphene film formed by use of a laser having an exciting wavelength of 514.5 nm, the peak positions of the 2D band, G band, D band and D' band are respectively 2700 cm-1, 1582 cm-1, 1350 cm-1 and 1620 cm-1 or the vicinity thereof. The G band is caused by a normal six-membered ring, and the 2D band is caused by harmonics of the D band. The D band is a peak caused by a defect of the normal six-membered ring. The D' band is also a peak induced by a defect, and is considered to be caused by an edge part of about several to several ten layers of graphene (see L. G. Cancado, M. A. Pimenta, B. R. A. Neves, M. S. S. Dantas, A. Jorio, Phys. Rev. Lett. 93 (2004) pp. 247401_1-247401_4). When the peaks of both of the G band and the 2D band are observed in the Raman scattering spectrum, the film is identified as a graphene film (see Xuesong Li, Weiwei Cai, Jinho An, Seyoung Kim, Junghyo Nah, Dongxing Yang, Richard Piner, Aruna Velamakanni, InhwaJung, Emanue L Tuluc, Sanjay K. Banerjee, Luigi Columbo, Rodney S. Ruoff, Science, Vol. 324, 2009, pp. 1312-1314). It is generally known that when the number of layers of graphene is increased, the 2D band is shifted toward the high wavenumber side and the half bandwidth is expanded. In addition, when the exciting wavelength of the laser is shortened, the 2D band is shifted toward the high wavenumber side.

(Method for Measuring the Light Transmittance)

A transparent conductive carbon film formed on a copper foil substrate by the technique according to the present invention was peeled off from the copper foil and bonded to a glass substrate. This was used as a sample. The glass substrate was a quartz glass substrate having a diameter of 10 mm and a thickness of 1 mm or a soda glass substrate having a width of 26 mm, a length of 75 mm and a thickness of 1 mm.

The transmittance measurement device used was NDH5000SP produced by Nippon Denshoku Industries Co., Ltd. The transmittance in a wavelength region of 550 nm was measured. The measurement was specifically performed as follows. First, the transmittance spectrum of the quartz glass with no graphene film bonded thereto was measured. Then, the transmittance spectrum of the quartz glass with a graphene film bonded thereto was measured. The transmittance spectrum of the quartz glass with no graphene film bonded thereto was subtracted from the transmittance spectrum of the quartz glass with the graphene film bonded thereto, and thus the transmittance spectrum of the graphene film itself was found.

(Method for Measuring the Electric Conductivity)

A graphene film formed on a copper foil substrate by the technique according to the present invention was peeled off from the copper foil substrate and bonded to an insulating substrate. This was used as a sample. The insulating substrate used was PDSM (polydimethylsiloxane; SILPOT 184 W/C produced by Dow Corning Toray Co., Ltd.), a quartz glass or a soda glass.

For evaluating the electric conductivity, a low resistivity meter Loresta GP MCP-T600 produced by Mitsubishi Chemical Corporation with a square probe (MCP-TPQPP) also produced by Mitsubishi Chemical Corporation having an inter-electrode distance of 1.5 mm was used. The upper limit of the voltage to be applied between the electrodes was set to 10 V or 90 V. The sample was demarcated into lattice squares each having a width of 2 cm. The square probe was pressed against the graphene film to measure the sheet resistance (surface resistivity).

Example 1

Figure 2:
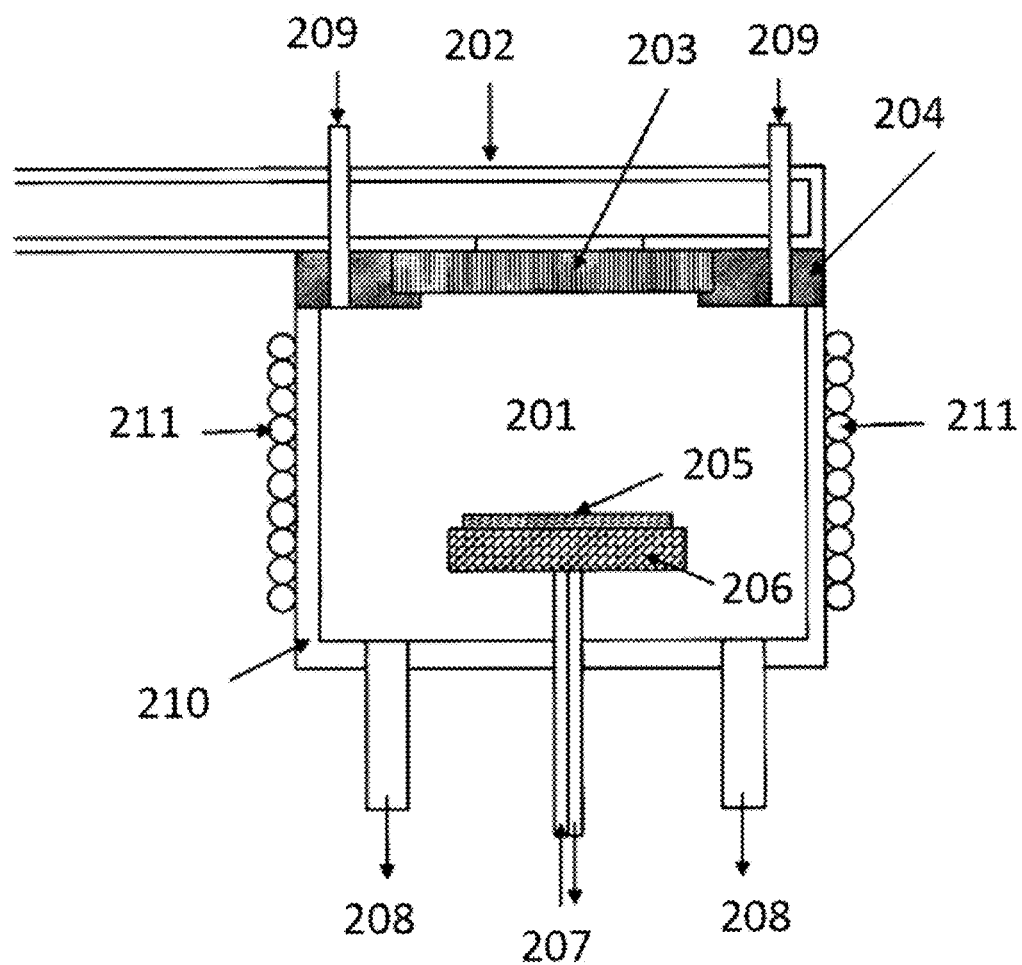
FIG. 2 is a cross-sectional view schematically showing a surface wave microwave plasma treatment device used in Examples 1 and 2.

In this example, a copper foil having poly(methyl methacrylate) applied thereon as an organic substance was subjected to hydrogen plasma treatment. FIG. 2 schematically shows a surface wave microwave plasma treatment device used in this example.

The surface wave microwave plasma treatment device used in this example includes a metal reaction vessel (210) having a top opening, an alumina window (203) attached to a top end of the reaction vessel (210) airtightly via a metal support (204) and usable for introducing microwaves, and a slotted rectangular microwave waveguide pipe (202) provided above the alumina window (203).

In this example, a sample was set inside the reaction vessel (210) and hydrogen plasma treatment was performed on the sample. The treatment procedure was as follows.

On a sample table (206) provided in a plasma generation chamber (201) inside the surface wave microwave plasma treatment vessel (210), a copper foil substrate (205) having the organic substance applied thereon was set. Next, the air in the reaction chamber was exhausted via an exhaust pipe (208) to reduce the pressure in the reaction chamber to $1 \times 10^{-3}$ Pa or lower. The reaction chamber had a cooling water pipe (211) wound therearound. Cooling water was supplied to the cooling water pipe (211) to cool the reaction chamber. The sample table was formed of copper. Cooling water was supplied to the sample table via a cooling water supply/discharge pipe (207) to cool the sample.

The height of the sample table was adjusted such that the distance between the alumina window (203) and the copper foil substrate having poly(methyl methacrylate) applied thereon would be 75 mm.

Next, hydrogen gas was introduced to the treatment chamber via a treating gas introduction pipe (209). The flow rate of the hydrogen gas was 30.0 SCCM. The pressure inside the reaction chamber was kept at 10 Pa by use of a pressure adjusting valve connected to the exhaust pipe (208).

Plasma was generated at a microwave power of 1.5 kW to perform hydrogen plasma treatment on the copper foil substrate (205) having the organic substance applied thereon. The temperature of the substrate during the hydrogen plasma treatment was measured by putting an alumel-chromel thermocouple into contact with a rear surface of the substrate. The temperature of the substrate was about 380° C. at the highest during the hydrogen plasma treatment. When the temperature of the substrate during the hydrogen plasma treatment becomes high, the copper foil may be melted or vanished as a result of vaporization. Therefore, it is important to control the temperature of the substrate with great care. As a result of the hydrogen plasma treatment, graphene was formed on the copper foil substrate. The plasma treatment time was 20 minutes.

Figure 3:
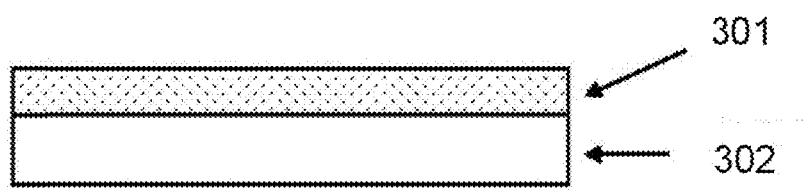
FIG. 3 is a schematic view of graphene, formed on a copper foil, obtained according to the present invention.

FIG. 3 is a schematic view of graphene (301) formed on the copper foil (302).

Figure 4:
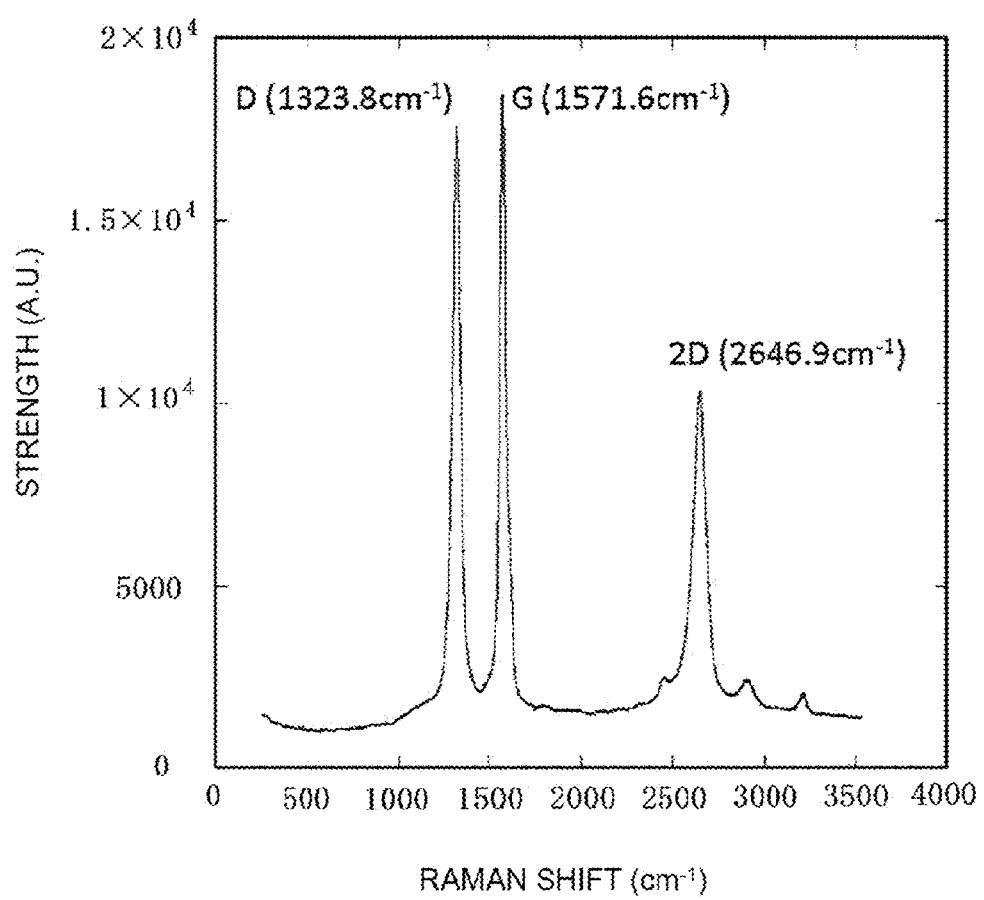
FIG. 4 shows a Raman scattering spectrum of graphene formed in Example 1.
Figure 5:
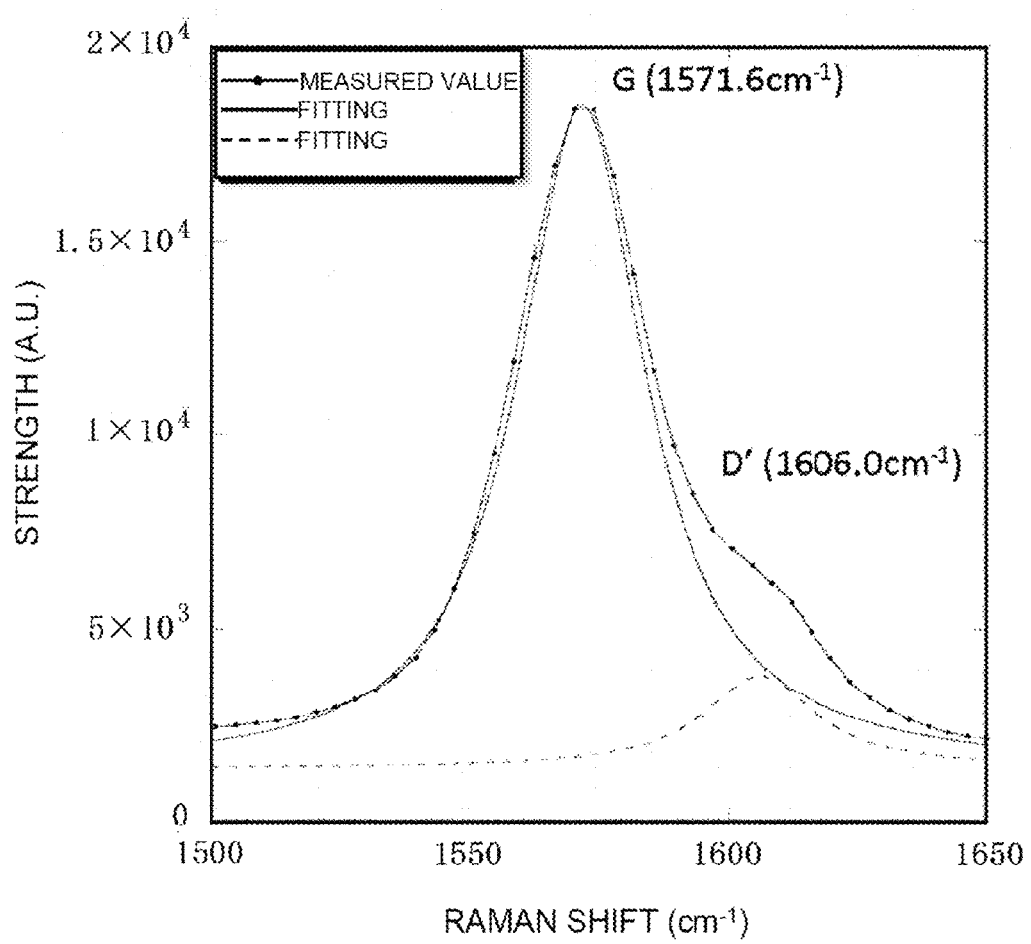
FIG. 5 is an enlarged view of the G band and the vicinity thereof of the Raman scattering spectrum of graphene formed in Example 1.
Figure 6:
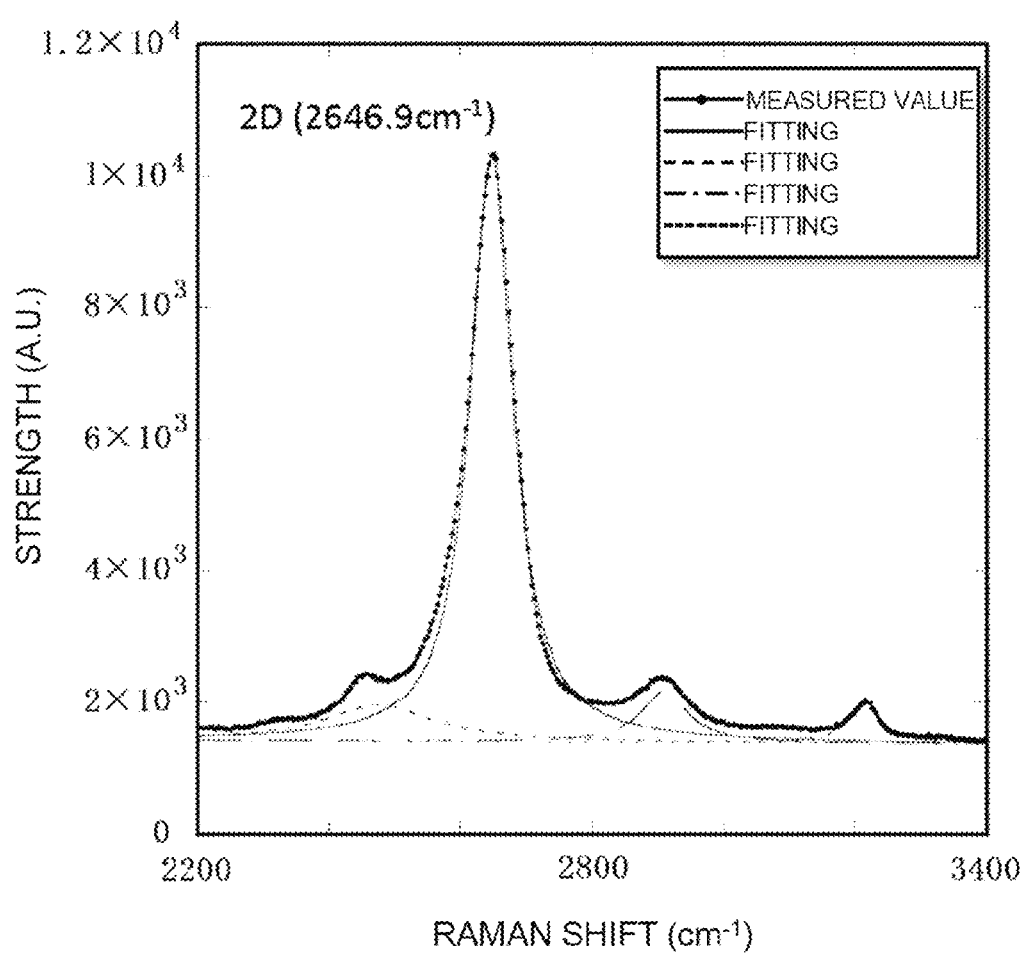
FIG. 6 is an enlarged view of the 2D band and the vicinity thereof of the Raman scattering spectrum of graphene formed in Example 1.

FIG. 4 shows an example of measured Raman scattering spectrum of graphene. FIG. 5 shows an enlarged spectrum and a fitting characteristic of the G band the vicinity thereof. FIG. 6 shows an enlarged spectrum and a fitting characteristic of the 2D band and the vicinity thereof. Important bands in the evaluation of graphene by the Raman scattering spectrum are the 2D band (2646.9 cm$^{-1}$), the G band (1571.6 cm$^{-1}$), the D band (1323.8 cm$^{-1}$) and the D' band (1606.0 cm$^{-1}$). When the peaks of both of the G band the 2D band are observed in the Raman scattering spectrum, the film is identified as a graphene film (see Xuesong Li, Weiwei Cai, Jinho An, Seyoung Kim, Junghyo Nah, Dongxing Yang, Richard Piner, Aruna Velamakanni, InhwaJung, Emanue L Tuluc, Sanjay K. Banerjee, Luigi Columbo, Rodney S. Ruoff, Science, Vol. 324, 2009, pp. 1312-1314).

In FIG. 4, the peaks of both of the G band and the 2D band were observed. Therefore, it is clear that the film formed by the present invention is a graphene film. In the case of graphite, which is a bulk crystalline carbon substance, the 2D band exhibits a shape having a shoulder on the low wavenumber side; whereas in the case of graphene, the 2D band exhibits a bilaterally symmetrical shape. Referring to FIG. 6, the peak widths of the left half and the right half of the 2D band were measured. The peak width of the left half (left half of the half bandwidth) was 39.2 cm$^{-1}$, and the peak width of the right half was 37 cm$^{-1}$. It was found that the shape of the peak was substantially bilaterally symmetrical. From this also, it is clear that the film obtained by the present invention is a graphene film. The D' band is a peak induced by a defect, and is considered to be caused by an edge part of about several to several ten layers of graphene.

The number of layers of graphene can be identified by use of the relative strengths of the peaks of the 2D band and the G band (Xuesong Li, Weiwei Cai, Jinho An, Seyoung Kim, Junghyo Nah, Dongxing Yang, Richard Piner, Aruna Velamakanni, InhwaJung, Emanue L Tuluc, Sanjay K. Banerjee, Luigi Columbo, Rodney S. Ruoff, Science, Vol. 324, 2009, pp. 1312-1314). The strength of each peak was found by fitting the respective peak by use of the Lorentzian function and subtracting the background. The peak strengths were l(2D)=9043.3, l(G)=17550.0, l(D')=5108.5, and l(D)=16617.6. When the ratio of the G band and the 2D band is l(2D)/l(G)≥2, the graphene film is a monolayer film; and when l(2D)/l(G)=1 to 2, the graphene film includes about 2 to 3 layers (Xuesong Li, Weiwei Cai, Jinho An, Seyoung Kim, Junghyo Nah, Dongxing Yang, Richard Piner, Aruna Velamakanni, InhwaJung, Emanue L Tuluc, Sanjay K. Banerjee, Luigi Columbo, Rodney S. Ruoff, Science, Vol. 324, 2009, pp. 1312-1314).

The graphene shown in FIG. 4, FIG. 5 and FIG. 6 was found to include one layer to several ten layers of graphene in a mixed state because of the peak strength ratio of the 2D band and the G band and also because the D' band was observed.

A cross-section of the graphene film formed by the technique in this example was observed with an electronic microscope. The sample for observation was formed by applying an amorphous carbon film on a transparent conductive carbon film and thinning the amorphous carbon film by a focus ion beam (FIB) method. The device used was XVision 200TB produced by SII Nanotechnology Inc. For observing a transmitted image by the electronic microscope, H-9000UHR produced by Hitachi, Ltd. was used. The image was observed under a condition of an acceleration voltage of 300 kV.

Figure 7:
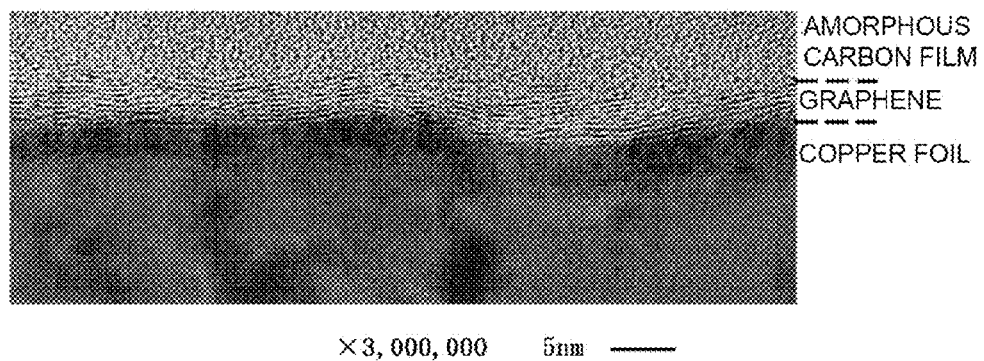
FIG. 7 is a photograph showing a transmitted image of graphene formed in Example 1 observed by an electronic microscope.

FIG. 7 shows the result of observation by the electronic microscope. The figure shows an amorphous carbon film/graphene/copper foil structure. The amorphous carbon film is a support member. From FIG. 7, the length and the number of graphene sheets were counted. The average length of the graphene sheets was 9.72 nm. The average number of layers of the graphene film was 9.4.

Next, the light transmittance and the electric conductivity of the graphene film formed by the technique in this example were measured. The transmittance was 90%, and the sheet resistance was 4.2Ω/□.

Example 2

In this example, a copper foil having benzotriazole applied thereon as an organic substance was subjected to hydrogen plasma treatment by use of a surface wave microwave plasma treatment device shown in FIG. 2 like in Example 1.

On the sample table (206) provided in the plasma generation chamber (201) inside the surface wave microwave plasma treatment vessel (210), a copper foil substrate (205) having the organic substance applied thereon was set. Next, the air in the reaction chamber was exhausted via the exhaust pipe (208) to reduce the pressure in the reaction chamber to $1 \times 10^{-3}$ Pa or lower. The reaction chamber had the cooling water pipe (211) wound therearound. Cooling water was supplied to the cooling water pipe (211) to cool the reaction chamber. The sample table was formed of copper. Cooling water was supplied to the sample table via the cooling water supply/discharge pipe (207) to cool the sample.

The height of the sample table was adjusted such that the distance between the alumina window (203) and the copper foil substrate having benzotriazole applied thereon would be 75 mm.

Next, hydrogen gas was introduced to the treatment chamber via the treating gas introduction pipe (209). The flow rate of the hydrogen gas was 30.0 SCCM. The pressure inside the reaction chamber was kept at 5 Pa by use of the pressure adjusting valve connected to the exhaust pipe (208).

Plasma was generated at a microwave power of 1.5 kW to perform hydrogen plasma treatment on the copper foil substrate (205) having the organic substance applied thereon. The temperature of the substrate during the hydrogen plasma treatment was measured by putting an alumel-chromel thermocouple into contact with a rear surface of the substrate. The temperature of the substrate was about 320° C. at the highest during the hydrogen plasma treatment. When the temperature of the substrate during the hydrogen plasma treatment becomes high, the copper foil may be melted or vanished as a result of vaporization. Therefore, it is important to control the temperature of the substrate with great care. As a result of the hydrogen plasma treatment, graphene was formed on the copper foil substrate. The plasma treatment time was 20 minutes.

FIG. 3 is a schematic view of graphene (301) formed on the copper foil.

Figure 8:
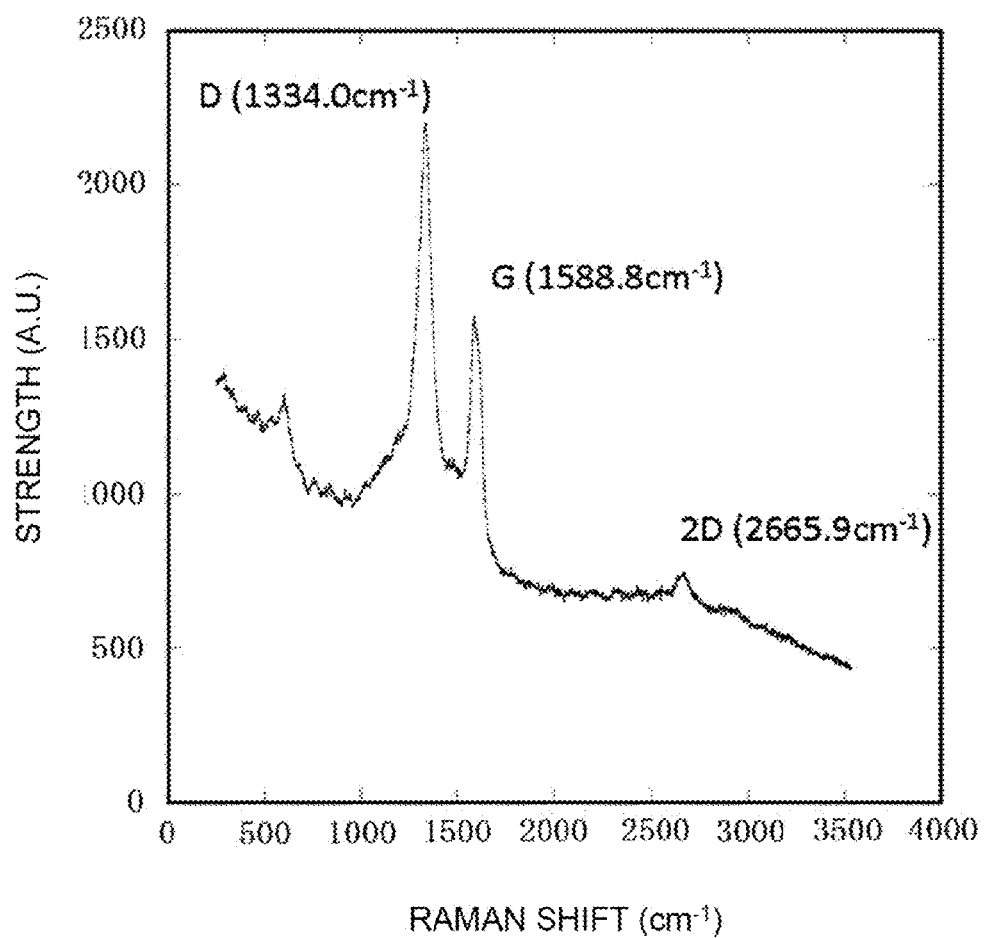
FIG. 8 shows a Raman scattering spectrum of graphene formed in Example 2.
Figure 9:
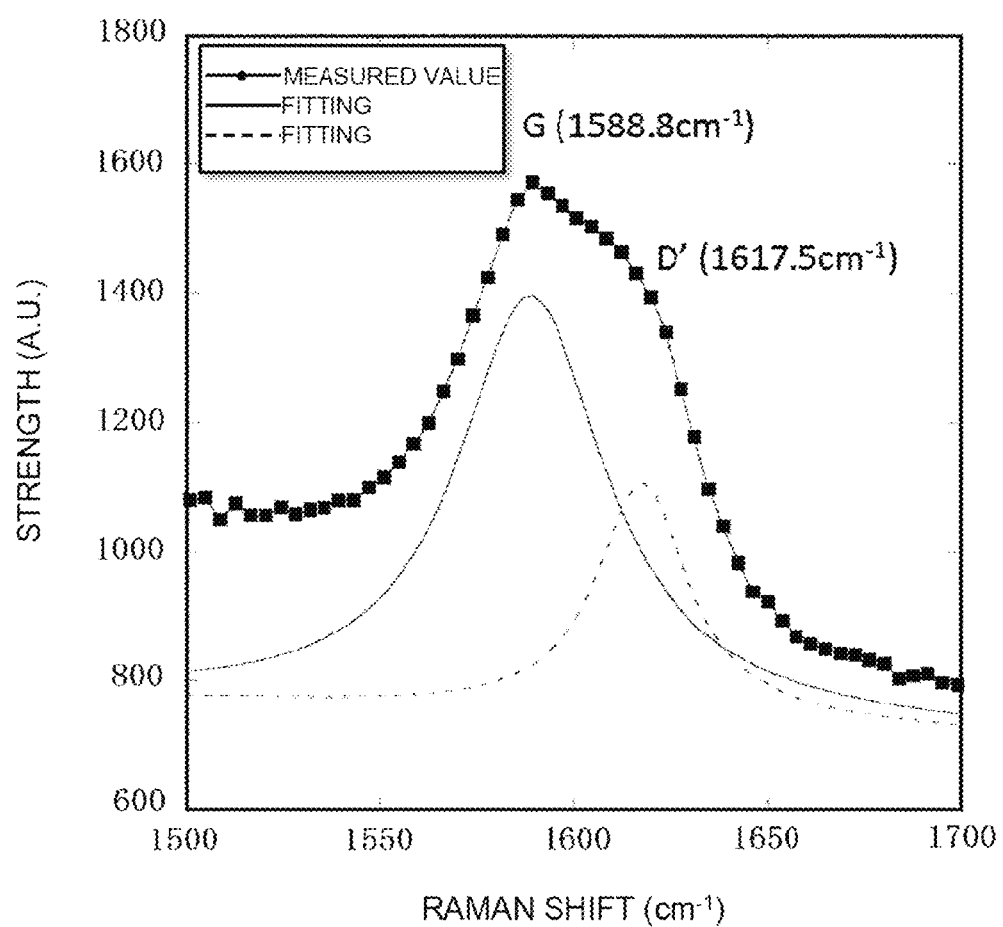
FIG. 9 is an enlarged view of the G band and the vicinity thereof of the Raman scattering spectrum of graphene formed in Example 2.
Figure 10:
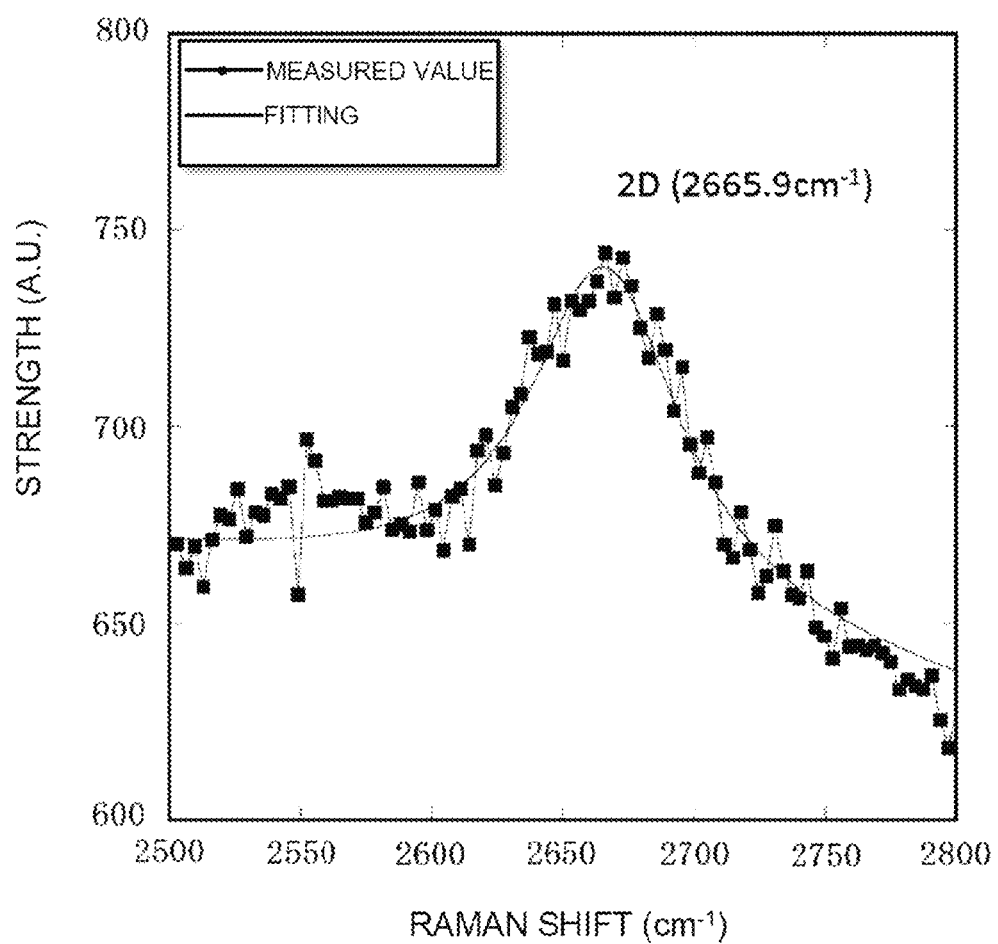
FIG. 10 is an enlarged view of the 2D band and the vicinity thereof of the Raman scattering spectrum of graphene formed in Example 2.

FIG. 8 shows an example of measured Raman scattering spectrum of graphene. FIG. 9 shows an enlarged spectrum and a fitting characteristic of the G band and the vicinity thereof. FIG. 10 shows an enlarged spectrum and a fitting characteristic of the 2D band and the vicinity thereof. Important bands in the evaluation of graphene by the Raman scattering spectrum are the 2D band (2665.9 cm$^{-1}$), the G band (1588.8 cm$^{-1}$), the D band (1334.0 cm$^{-1}$) and the D' band (1617.5 cm$^{-1}$). When the peaks of both of the G band the 2D band are observed in the Raman scattering spectrum, the film is identified as a graphene film (see Xuesong Li, Weiwei Cai, Jinho An, Seyoung Kim, Junghyo Nah, Dongxing Yang, Richard Piner, Aruna Velamakanni, InhwaJung, Emanue L Tuluc, Sanjay K. Banerjee, Luigi Columbo, Rodney S. Ruoff, Science, Vol. 324, 2009, pp. 1312-1314).

In FIG. 8, the peaks of both of the G band and the 2D band were observed. Therefore, it is clear that the film formed by the present invention is a graphene film. In the case of graphite, which is a bulk crystalline carbon substance, the 2D band exhibits a shape having a shoulder on the low wavenumber side; whereas in the case of graphene, the 2D band exhibits a bilaterally symmetrical shape. Referring to FIG. 10, the peak widths of the left half and the right half of the 2D band were measured. The peak width of the left half was 40.0 cm$^{-1}$, and the peak width of the right half was 37.2 cm$^{-1}$. It was found that the shape of the peak was substantially bilaterally symmetrical. From this also, it is clear that the film obtained by the present invention is a graphene film. The D' band is a peak induced by a defect, and is considered to be caused by an edge part of about several to several ten layers of graphene.

The number of layers of graphene can be estimated by use of the relative strengths of the peaks of the 2D band and the G band (Xuesong Li, Weiwei Cai, Jinho An, Seyoung Kim, Junghyo Nah, Dongxing Yang, Richard Piner, Aruna Velamakanni, InhwaJung, Emanue L Tuluc, Sanjay K. Banerjee, Luigi Columbo, Rodney S. Ruoff, Science, Vol. 324, 2009, pp. 1312-1314). As shown in FIG. 9 and FIG. 10, the strength of each peak was found by fitting the respective peak by use of the Lorentzian function and subtracting the background. The peak strengths were l(2D)=86.8, l(G)=821, l(D')=761.3, and l(D)=1335. When the ratio of the G band and the 2D band is l(2D)/l(G)≥2, the graphene film is a monolayer film; and when l(2D)/l(G)=1 to 2, the graphene film includes about 2 to 3 layers (Xuesong Li, Weiwei Cai, Jinho An, Seyoung Kim, Junghyo Nah, Dongxing Yang, Richard Piner, Aruna Velamakanni, InhwaJung, Emanue L Tuluc, Sanjay K. Banerjee, Luigi Columbo, Rodney S. Ruoff, Science, Vol. 324, 2009, pp. 1312-1314).

The graphene shown in FIG. 8, FIG. 9 and FIG. 10 was found to include one layer to several ten layers of graphene in a mixed state because of the peak strength ratio of the 2D band and the G band and also because the D' band was observed.

Example 3

In this example, a copper foil having poly(methyl methacrylate) applied thereon as an organic substance and a copper foil having benzotriazole thereon applied thereon as an organic substance were each subjected to argon/hydrogen plasma treatment.

Hereinafter, the argon/hydrogen plasma treatment used in this example will be described in detail. The method for applying the organic substances was substantially the same as in Examples 1 and 2.

Figure 11:
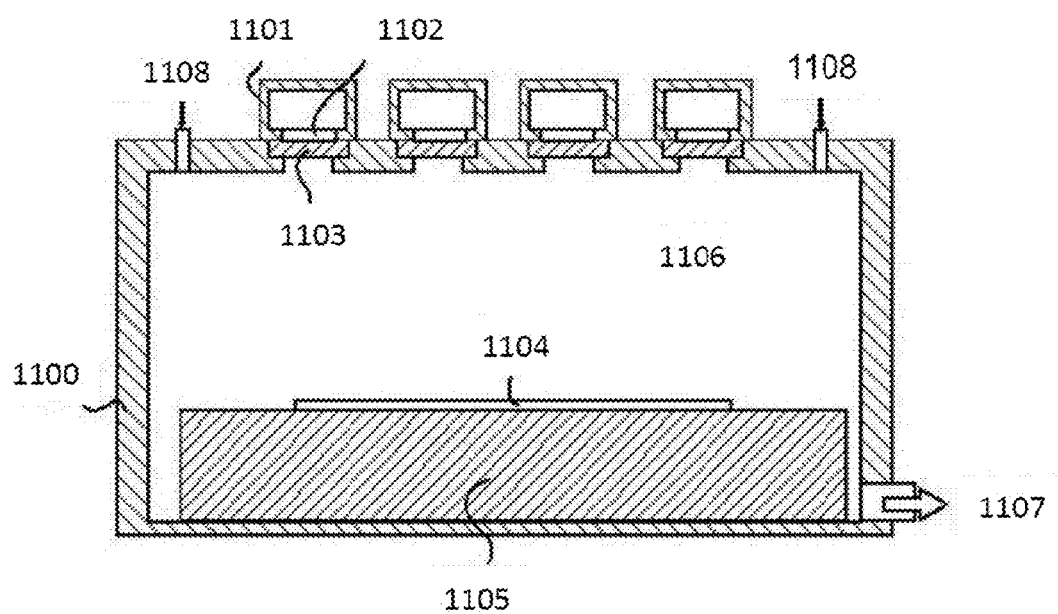
FIG. 11 is a cross-sectional view schematically showing a surface wave microwave plasma treatment device having a large area size used in Examples 3 and 4.

In this example, a large area size plasma device as shown in FIG. 11 was used to synthesize graphene films. The large area size plasma device includes four plasma-generating microwave launchers and an enlarged surface wave microwave plasma (plasma treatment area: area size of the cross-section: 600 mm×400 mm; height: 200 mm).

FIG. 11 shows a cross-section of the device. Referring to FIG. 11, reference numeral 1100 represents a discharge vessel, reference numeral 1101 represents a rectangular waveguide pipe, reference numeral 1102 represents a slot antenna, reference numeral 1103 represents a quartz window, reference numeral 1104 represents a substrate, reference numeral 1105 represents a sample table, reference numeral 1106 represents a reaction chamber, reference numeral 1107 represents a treating gas introduction pipe, and reference numeral 1108 represents an exhaust pipe.

In this example, a copper foil having a thickness of 33 μm was set in the reaction chamber (1106), and argon/hydrogen plasma treatment was performed on the copper foil. The experimental conditions were as follows.

The microwave power was 4.5 kW per microwave launcher. The pressure inside the discharge vessel was 5 Pa. The plasma treating gas was argon gas having a flow rate of 30 SCCM and hydrogen gas having a flow rate of 50 SCCM. The pressure inside the reaction chamber was kept at 5 Pa by use of a pressure adjusting valve connected to the exhaust pipe (1108). In this example, it was possible to change the distance between the quartz window (1103) and the copper foil substrate from 40 mm to 190 mm. In this example, plasma CVD treatment was performed while the distance between the quartz window (1103) and the copper foil substrate was 190 mm.

Figure 12:
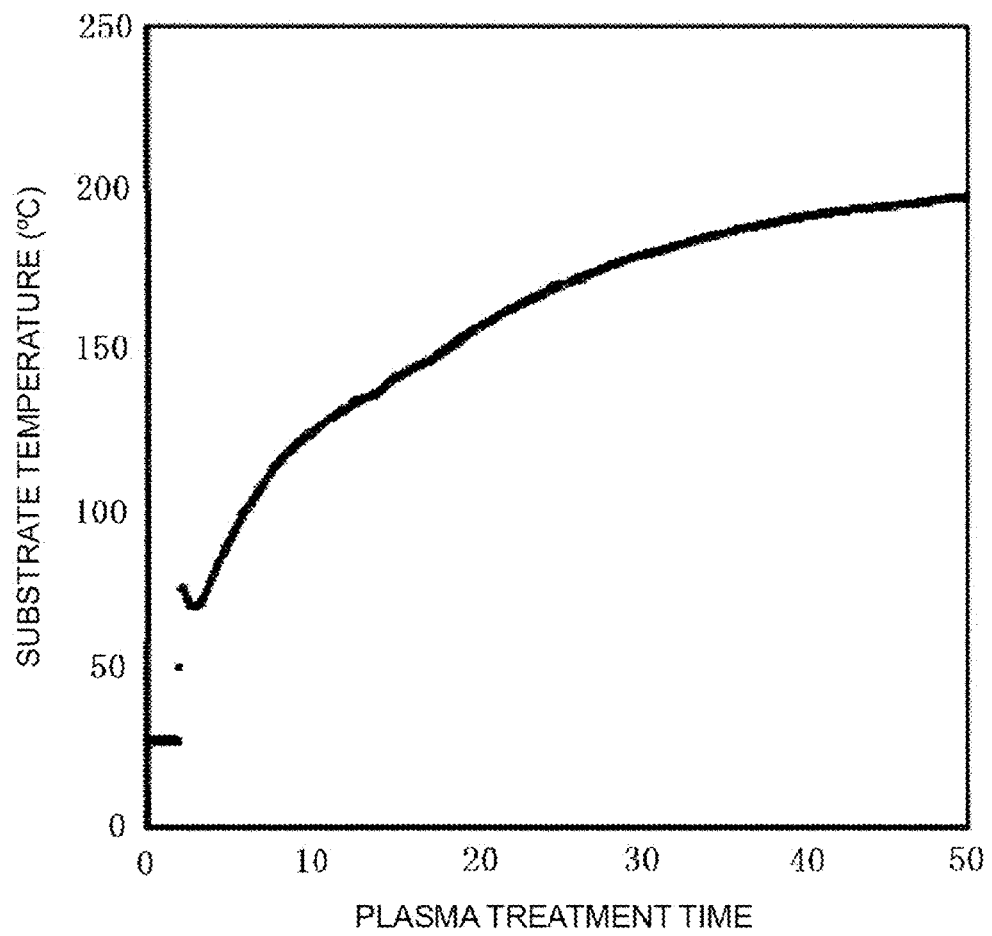
FIG. 12 shows the relationship between the time from the start of plasma treatment and the temperature of the substrate in Example 3.

FIG. 12 shows the relationship between the time from the start of plasma treatment and the temperature of the substrate. It was confirmed that the temperature of the substrate was raised along with the time.

Figure 13:
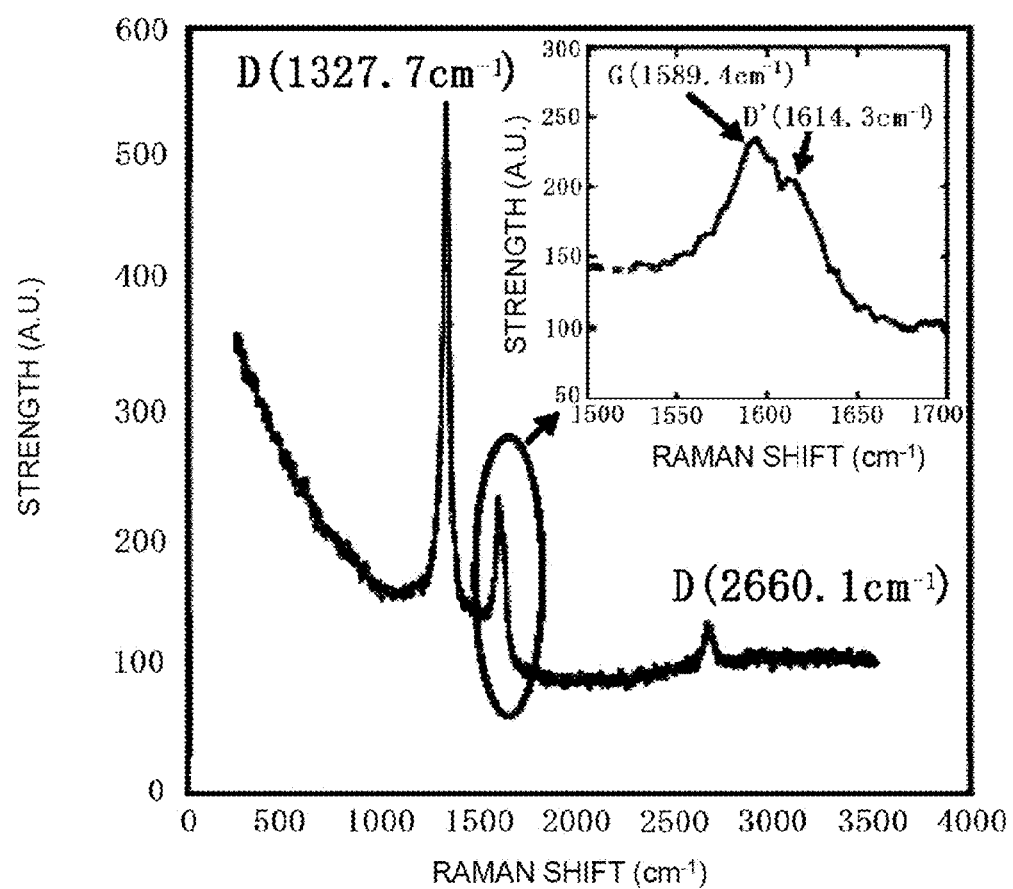
FIG. 13 shows a Raman scattering spectrum of graphene formed on a copper foil having poly(methyl methacrylate) applied thereon as an organic substance in Example 3.
Figure 14:
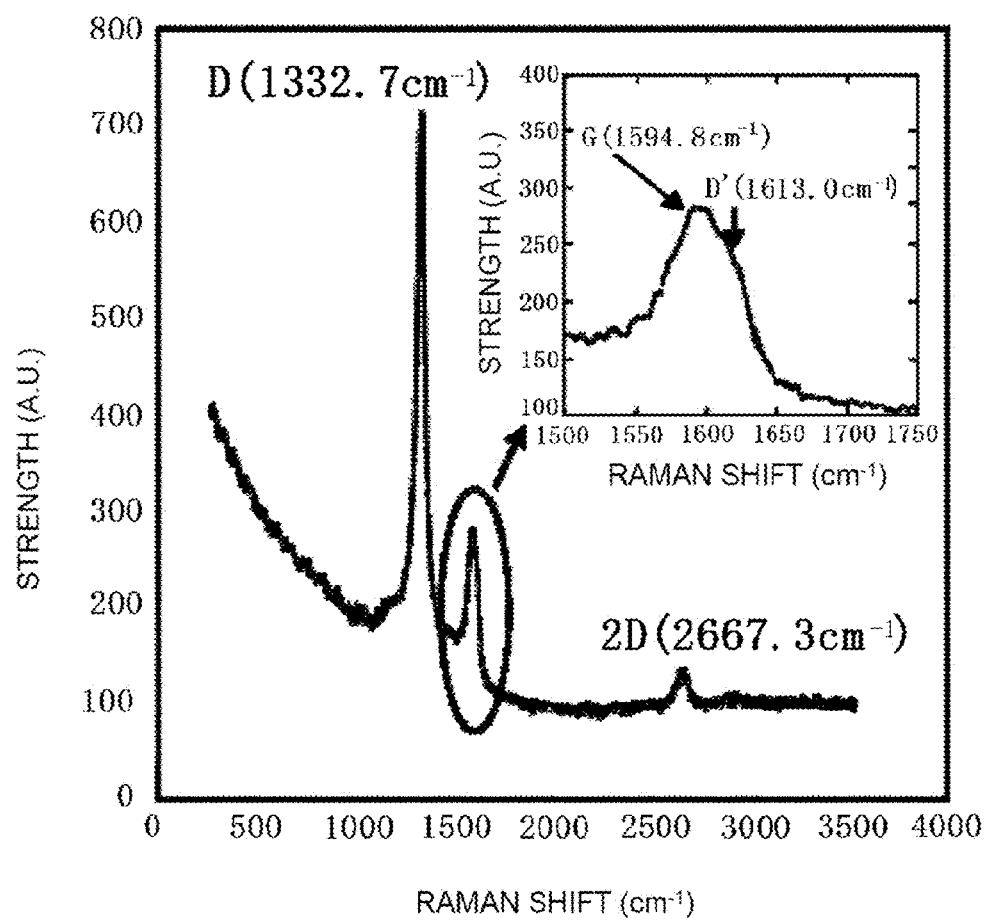
FIG. 14 shows a Raman scattering spectrum of graphene formed on a copper foil having benzotriazole applied thereon as an organic substance in Example 3.

FIG. 13 shows the Raman spectrum of the sample obtained as a result of the argon/hydrogen plasma treatment performed for 20 minutes on the copper foil having poly(methyl methacrylate) applied thereon as an organic substance. FIG. 14 shows the Raman spectrum of the sample obtained as a result of the argon/hydrogen plasma treatment performed for 20 minutes on the copper foil having benzotriazole applied thereon as an organic substance. The temperature of each substrate when the plasma treatment was finished was 152° C.

In the Raman spectrum of the sample obtained as a result of the argon/hydrogen plasma treatment performed for 20 minutes on the copper foil having poly(methyl methacrylate) applied thereon as an organic substance (FIG. 13), the 2D band (2660.1 cm$^{-1}$), the G band (1589.4 cm$^{-1}$), the D band (1327.7 cm$^{-1}$) and the D' band (1614.3 cm$^{-1}$), which were important for the evaluation of graphene by the Raman scattering spectroscopy, were observed. The strengths of the respective peaks obtained by subtracting the background were l(2D)=33.1, l(G)=152.5, l(D')=122, and l(D)=481.2. When the ratio of the G band and the 2D band is l(2D)/l(G)≥2, the graphene film is a monolayer film; and when l(2D)/l(G)=1 to 2, the graphene film includes about 2 to 3 layers (Xuesong Li, Weiwei Cai, Jinho An, Seyoung Kim, Junghyo Nah, Dongxing Yang, Richard Piner, Aruna Velamakanni, Inhwa-Jung, Emanue L Tuluc, Sanjay K. Banerjee, Luigi Columbo, Rodney S. Ruoff, Science, Vol. 324, 2009, pp. 1312-1314). The graphene was found to include one layer to several ten layers of graphene in a mixed state because of the peak strength ratio of the 2D band and the G band and also because the D' band was observed.

In FIG. 13, the peaks of both of the G band and the 2D band were observed. Therefore, it is clear that the film formed by the present invention is a graphene film. In the case of graphite, which is a bulk crystalline carbon substance, the 2D band exhibits a shape having a shoulder on the low wavenumber side; whereas in the case of graphene, the 2D band exhibits a bilaterally symmetrical shape. Referring to FIG. 13, the peak widths of the left half and the right half of the 2D band were measured. The peak width of the left half was 31.0 cm$^{-1}$, and the peak width of the right half was 30.2 cm$^{-1}$. It was found that the shape of the peak was substantially bilaterally symmetrical. From this also, it is clear that the film obtained by the present invention is a graphene film. The D' band is a peak induced by a defect, and is considered to be caused by an edge part of about several to several ten layers of graphene.

In the Raman spectrum of the sample obtained as a result of the argon/hydrogen plasma treatment performed for 20 minutes on the copper foil having benzotriazole applied thereon as an organic substance (FIG. 14), the 2D band (2667.3 cm$^{-1}$), the G band (1594.8 cm$^{-1}$), the D band (1332.7 cm$^{-1}$) and the D' band (1613.0 cm$^{-1}$), which were important for the evaluation of graphene by the Raman scattering spectroscopy, were observed. The strengths of the respective peaks obtained by subtracting the background were l(2D)=26.5, l(G)=105.2, l(D')=75.2, and l(D)=371.0. When the ratio of the G band and the 2D band is l(2D)/l(G)≥2, the graphene film is a monolayer film; and when l(2D)/l(G)=1 to 2, the graphene film includes about 2 to 3 layers (Xuesong Li, Weiwei Cai, Jinho An, Seyoung Kim, Junghyo Nah, Dongxing Yang, Richard Piner, Aruna Velamakanni, InhwaJung, Emanue L Tuluc, Sanjay K. Banerjee, Luigi Columbo, Rodney S. Ruoff, Science, Vol. 324, 2009, pp. 1312-1314). The graphene was found to include one layer to several ten layers of graphene in a mixed state because of the peak strength ratio of the 2D band and the G band and also because the D' band was observed.

In FIG. 14, the peaks of both of the G band and the 2D band were observed. Therefore, it is clear that the film formed by the present invention is a graphene film. In the case of graphite, which is a bulk crystalline carbon substance, the 2D band exhibits a shape having a shoulder on the low wavenumber side; whereas in the case of graphene, the 2D band exhibits a bilaterally symmetrical shape. Referring to FIG. 14, the peak widths of the left half and the right half of the 2D band were measured. The peak width of the left half was 37.2 cm$^{-1}$, and the peak width of the right half was 35 cm$^{-1}$. It was found that the shape of the peak was substantially bilaterally symmetrical. From this also, it is clear that the film obtained by the present invention is a graphene film. The D' band is a peak induced by a defect, and is considered to be caused by an edge part of about several to several ten layers of graphene.

Example 4

In this example, a copper foil having poly(methyl methacrylate) applied thereon as an organic substance and a copper foil having benzotriazole applied thereon as an organic substance were each subjected to argon/hydrogen plasma treatment for 50 minutes by the same method as in Example 3. The temperature of each substrate when the plasma treatment was finished was 196° C.

In the Raman spectrum of the sample obtained as a result of the argon/hydrogen plasma treatment performed for 50 minutes on the copper foil having poly(methyl methacrylate) applied thereon as an organic substance (FIG. 15), the 2D band (2678.5 cm$^{-1}$), the G band (1591.7 cm$^{-1}$), the D band (1335.8 cm$^{-1}$) and the D' band (1614.3 cm$^{-1}$), which were important for the evaluation of graphene by the Raman scattering spectroscopy, were observed. The strengths of the respective peaks obtained by subtracting the background were l(2D)=17.6, l(G)=84.9, l(D')=54.1, and l(D)=1212.7. When the ratio of the G band and the 2D band is l(2D)/l(G)≥2, the graphene film is a monolayer film; and when l(2D)/l(G)=1 to 2, the graphene film includes about 2 to 3 layers (Xuesong Li, Weiwei Cai, Jinho An, Seyoung Kim, Junghyo Nah, Dongxing Yang, Richard Piner, Aruna Velamakanni, Inhwa-Jung, Emanue L Tuluc, Sanjay K. Banerjee, Luigi Columbo, Rodney S. Ruoff, Science, Vol. 324, 2009, pp. 1312-1314). The graphene was found to include one layer to several ten layers of graphene in a mixed state because of the peak strength ratio of the 2D band and the G band and also because the D' band was observed.

Figure 15:
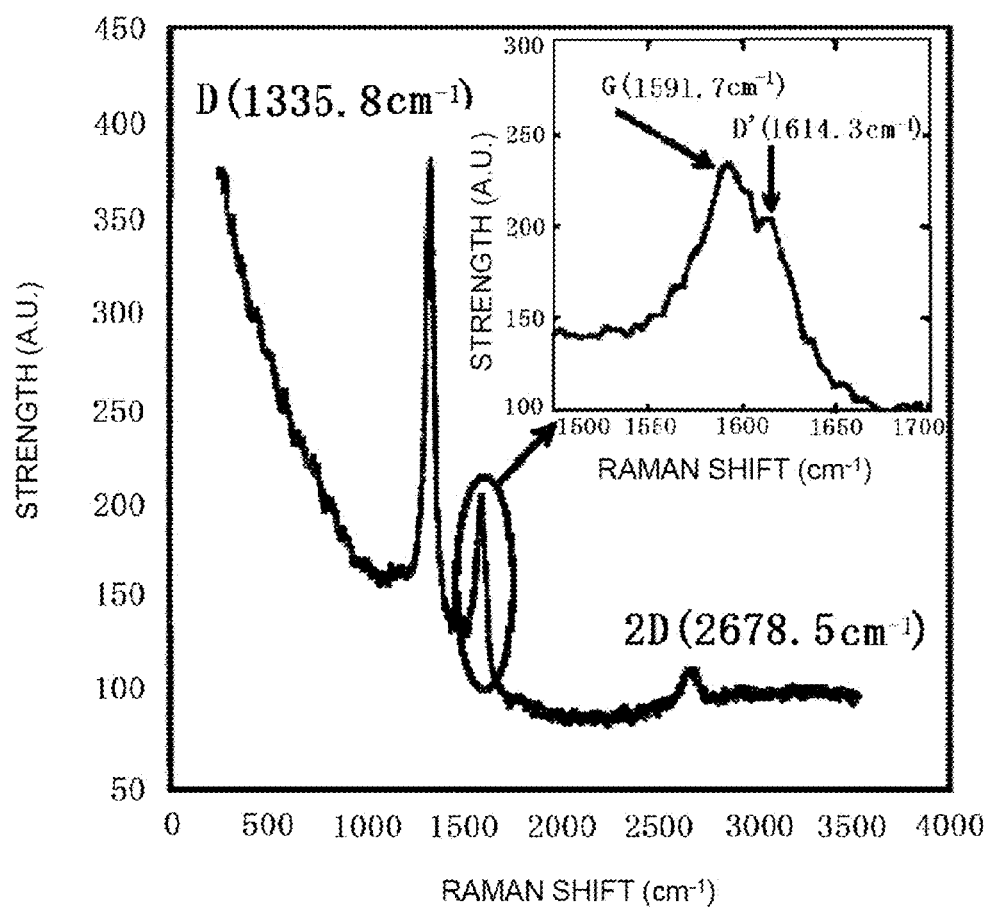
FIG. 15 shows a Raman scattering spectrum of graphene formed on a copper foil having poly(methyl methacrylate) applied thereon as an organic substance in Example 4.

In FIG. 15, the peaks of both of the G band and the 2D band were observed. Therefore, it is clear that the film formed by the present invention is a graphene film. In the case of graphite, which is a bulk crystalline carbon substance, the 2D band exhibits a shape having a shoulder on the low wavenumber side; whereas in the case of graphene, the 2D band exhibits a bilaterally symmetrical shape. Referring to FIG. 15, the peak widths of the left half and the right half of the 2D band were measured. The peak width of the left half was 39.0 cm$^{-1}$, and the peak width of the right half was 31.0 cm$^{-1}$. It was found that the shape of the peak was substantially bilaterally symmetrical. From this also, it is clear that the film obtained by the present invention is a graphene film. The D' band is a peak induced by a defect, and is considered to be caused by an edge part of about several to several ten layers of graphene.

In the Raman spectrum of the sample obtained as a result of the argon/hydrogen plasma treatment performed for 50 minutes on the copper foil having benzotriazole applied thereon as an organic substance (FIG. 16), the 2D band (2678.5 cm$^{-1}$), the G band (1599.2 cm$^{-1}$), the D band (1328.4 cm$^{-1}$) and the D' band (1620.3 cm$^{-1}$), which were important for the evaluation of graphene by the Raman scattering spectroscopy, were observed. The strengths of the respective peaks obtained by subtracting the background were l(2D)=8.9, l(G)=44.3, l(D')=30.9, and l(D)=156.6. When the ratio of the G band and the 2D band is l(2D)/l(G)≥2, the graphene film is a monolayer film; and when l(2D)/l(G)=1 to 2, the graphene film includes about 2 to 3 layers (Xuesong Li, Weiwei Cai, Jinho An, Seyoung Kim, Junghyo Nah, Dongxing Yang, Richard Piner, Aruna Velamakanni, Inhwa Jung, Emanue L Tuluc, Sanjay K. Banerjee, Luigi Columbo, Rodney S. Ruoff, Science, Vol. 324, 2009, pp. 1312-1314). The graphene was found to include one layer to several ten layers of graphene in a mixed state because of the peak strength ratio of the 2D band and the G band and also because the D' band was observed.

Figure 16:
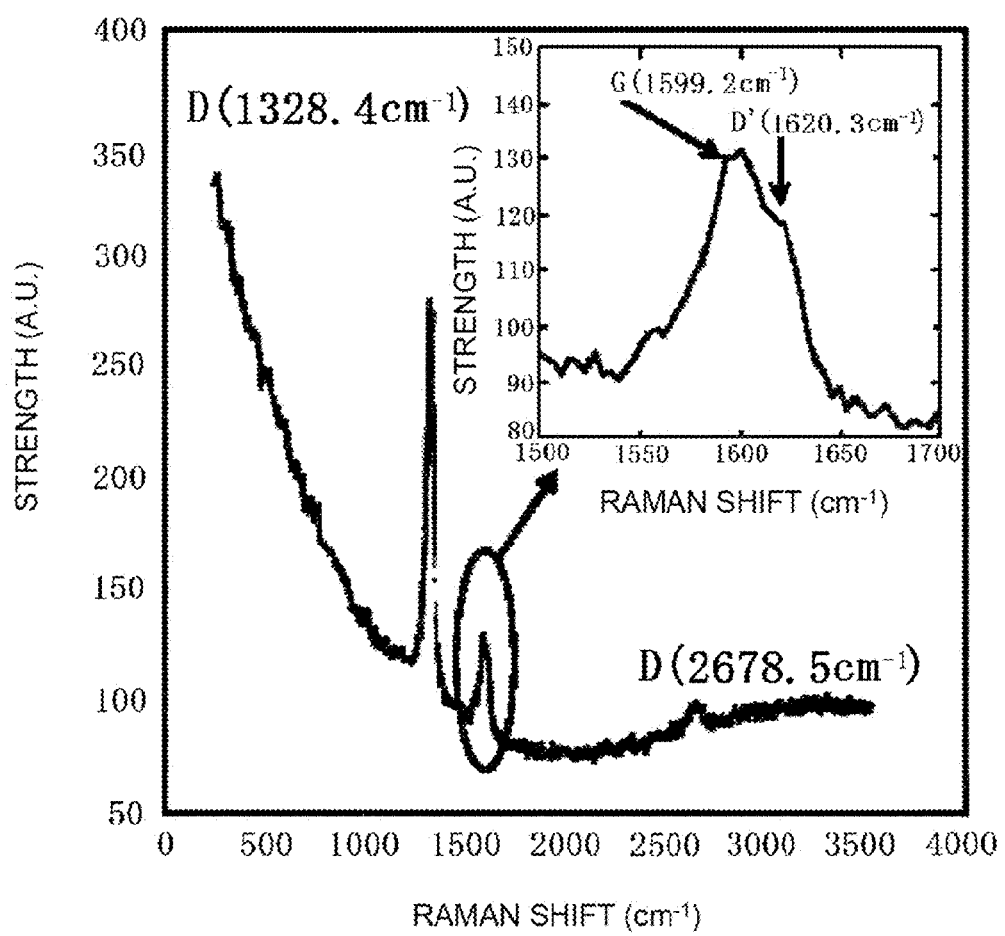
FIG. 16 shows a Raman scattering spectrum of graphene formed on a copper foil having benzotriazole applied thereon as an organic substance in Example 4.

In FIG. 16, the peaks of both of the G band and the 2D band were observed. Therefore, it is clear that the film formed by the present invention is a graphene film. In the case of graphite, which is a bulk crystalline carbon substance, the 2D band exhibits a shape having a shoulder on the low wavenumber side; whereas in the case of graphene, the 2D band exhibits a bilaterally symmetrical shape. Referring to FIG. 16, the peak widths of the left half and the right half of the 2D band were measured. The peak width of the left half was 42.2 cm$^{-1}$, and the peak width of the right half was 43.0 cm$^{-1}$. It was found that the shape of the peak was substantially bilaterally symmetrical. From this also, it is clear that the film obtained by the present invention is a graphene film. The D' band is a peak induced by a defect, and is considered to be caused by an edge part of about several to several ten layers of graphene.

Comparative Example

As shown in the above-described examples, according to the present invention, graphene can be formed at 400° C. or lower by use of the surface wave microwave plasma treatment. In this comparative example, the effect provided by heating treatment was examined.

As the substrates, a copper foil having poly(methyl methacrylate) applied thereon as an organic substance and a copper foil having benzotriazole applied thereon as an organic substance, obtained by substantially the same methods as in Example 1 and Example 2, were used. These substrates were heat-treated. The copper foil having poly(methyl methacrylate) applied thereon as an organic substance and the copper foil having benzotriazole applied thereon as an organic substance which were used in this comparative example were substantially the same as those in Example 1 and Example 2.

The heat treatment was performed by use of a desk lamp heating system (MILA-5000) produced by Ulvac-Riko, Inc. The copper foil having poly(methyl methacrylate) applied thereon as an organic substance and the copper foil having benzotriazole applied thereon as an organic substance were respectively placed on quartz sample holders, and the air was exhausted until the pressure was reduced to 10$^{-4}$ Pa or lower. The flow rates of hydrogen gas and argon gas were 100 sccm and 200 sccm, respectively, and the pressure was kept at 100 Pa. Then, the temperature was raised from room temperature to 400° C. over 5 minutes, and heat treatment was performed at 400° C. for 20 minutes. The heating conditions, namely, the temperature and the time, in this comparative example were substantially the same as those in Example 1.

Figure 17:
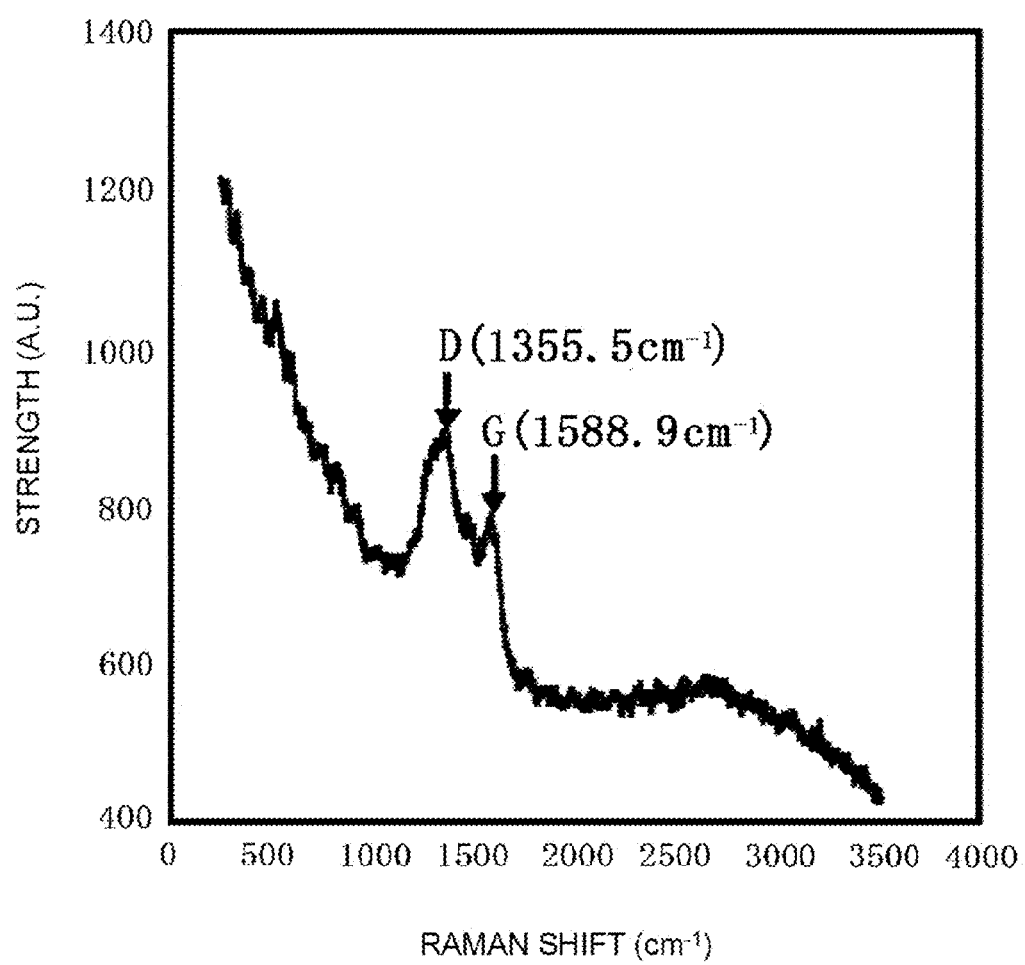
FIG. 17 shows a Raman scattering spectrum of a sample obtained by heat treatment performed on a copper foil having poly(methyl methacrylate) applied thereon as an organic substance in a comparative example.
Figure 18:
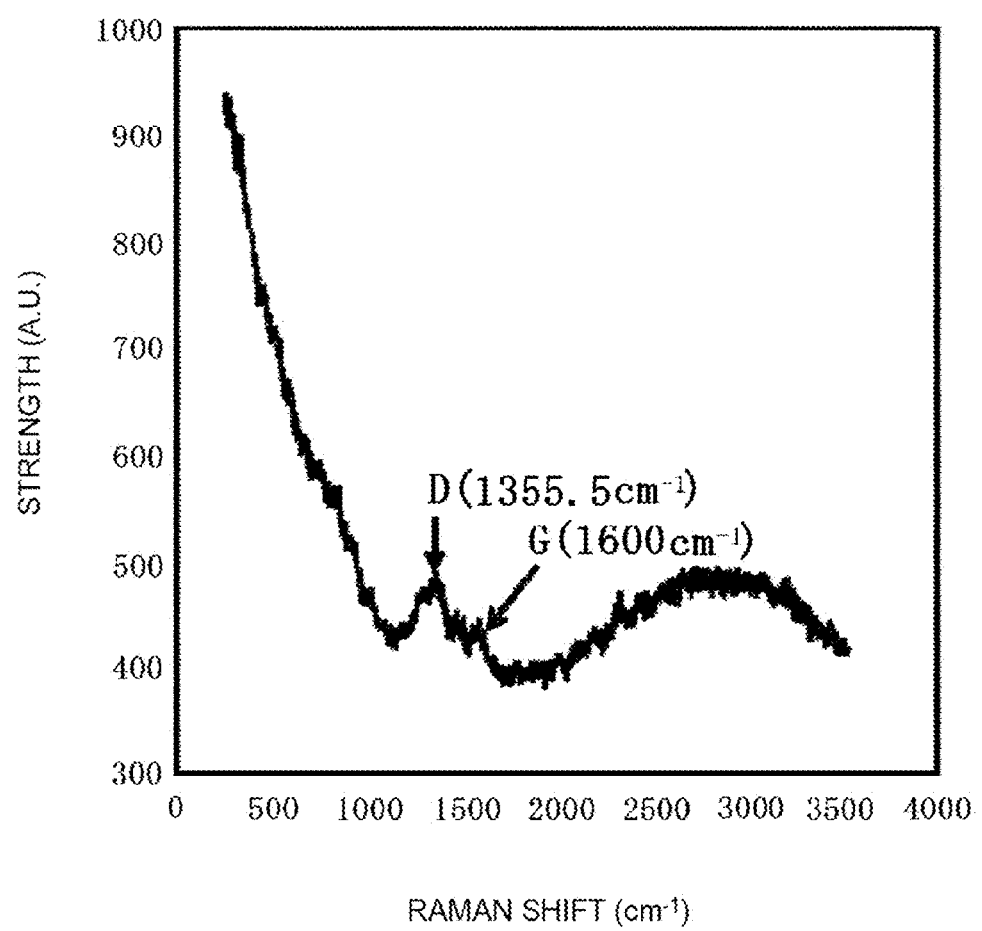
FIG. 18 shows a Raman scattering spectrum of a sample obtained by heat treatment performed on a copper foil having benzotriazole applied thereon as an organic substance in the comparative example.

FIG. 17 shows the Raman spectrum of the sample obtained as a result of the heat treatment performed on the copper foil having poly(methyl methacrylate) applied thereon as an organic substance. FIG. 18 shows the Raman spectrum of the sample obtained as a result of the heat treatment performed on the copper foil having benzotriazole applied thereon as an organic substance. In FIG. 17, the G band (1588.9 cm$^{-1}$) and the D band (1355.5 cm$^{-1}$) were observed, but the 2D band was not observed. In FIG. 18, the G band (1600 cm$^{-1}$) and the D band (1355.5 cm$^{-1}$) were observed, but the 2D band was not observed.

From FIG. 17 and FIG. 18, it was confirmed that graphene was not formed by performing heat treatment at 400° C. for 20 minutes. From this, it has been made clear that plasma treatment is necessary in order to form graphene at a low temperature of 400° C. or lower.

According to the method of the present invention, the problems of the conventional thermal CVD and resin carbonization methods that a high temperature is used and the treatment time is long are solved, and graphene can be formed at a lower temperature in a shorter time.

The method of the present invention enables graphene to be synthesized in a large area size at a low temperature. Therefore, graphene produced by the method can be applied for transparent conductive films usable for touch panels and the like, semiconductor devices and electronic devices such as transistors, integrated circuits and the like, transparent electrodes and electrochemical electrodes which require a large area size, biological devices, and the like.

The method for producing graphene according to the present invention can provide graphene in a large area size at a low temperature. Therefore, graphene produced by the method according to the present invention is applicable for transparent conductive films usable for as touch panels and the like; semiconductor devices and electronic devices such as transistors, integrated circuits and the like; transparent electrodes and electrochemical electrodes requiring a large area size; and all the devices, apparatuses and applied products using graphene such as biological devices and the like. Thus, the present invention provides a very important technology.

The invention claimed is:

1. A method for producing graphene, comprising performing a surface wave microwave plasma treatment using hydrogen-containing gas on a metal substrate having an organic substance thereon under a low pressure of 50 Pa or lower while a temperature of the metal substrate having the organic substance thereon inside a surface wave microwave plasma treatment device is set to 500° C. or lower, thereby growing graphene on a surface of the organic substance.

2. The method for producing graphene according to claim 1, wherein the organic substance is poly(methyl methacrylate) or benzotriazole.

3. The method for producing graphene according to claim 1, wherein the metal substrate is a copper thin film.

4. A method for producing graphene, comprising performing a surface wave microwave plasma treatment using hydrogen-containing gas on a metal substrate having an organic substance thereon under a low pressure of 50 Pa or lower while a temperature of the metal substrate having the organic substance thereon inside a surface wave microwave plasma treatment device is set to 500° C. or lower, thereby forming a stack including the metal substrate and graphene grown on a surface of the organic substance applied on the metal substrate; and peeling off the graphene from the metal substrate.

5. The method for producing graphene according to claim 4, wherein the organic substance is poly(methyl methacrylate) or benzotriazole.

6. The method for producing graphene according to claim 4, wherein the metal substrate is a copper thin film.

7. The method for producing graphene according to claim 1, wherein the plasma treatment is performed about 1 second to 50 minutes.

8. The method for producing graphene according to claim 1, wherein the organic substance is selected from a group consisting of acrylic resins, benzotriazoles, polymers, phenol resins, and combination thereof.

9. The method for producing graphene according to claim 1, wherein the organic substance is selected from a group consisting of polyacrylic acid, polyacrylic acid ester, polymethacrylic acid, polymethacrylic acid ester, poly(methyl methacrylate), polyethyleneglycol-bis(1,2,3-benzotriazolyl ether), polyethyleneglycol-1,2,3-benzotriazolyl ether, poly(vinyl chloride), polyethylene, phenol resins, and combination thereof.

10. The method for producing graphene according to claim 1, wherein the metal substrate is made of a metal material selected from a group consisting of nickel, copper, iridium, platinum, and combination thereof.

11. The method for producing graphene according to claim 4, wherein the plasma treatment is performed about 1 second to 50 minutes.

12. The method for producing graphene according to claim 4, wherein the organic substance is selected from a group consisting of acrylic resins, benzotriazoles, polymers, phenol resins, and combination thereof.

13. The method for producing graphene according to claim 4, wherein the organic substance is selected from a group consisting of polyacrylic acid, polyacrylic acid ester, polymethacrylic acid, polymethacrylic acid ester, poly(methyl methacrylate), polyethyleneglycol-bis(1,2,3-benzotriazolyl ether), polyethyleneglycol-1,2,3-benzotriazolyl ether, poly(vinyl chloride), polyethylene, phenol resins, and combination thereof.

14. The method for producing graphene according to claim 4, wherein the metal substrate is made of a metal material selected from a group consisting of nickel, copper, iridium, platinum, and combination thereof.

* * * * *